US008620217B2

(12) United States Patent
Saito et al.

(10) Patent No.: US 8,620,217 B2
(45) Date of Patent: Dec. 31, 2013

(54) SHORT RANGE WIRELESS COMMUNICATION APPARATUS

(75) Inventors: Soichi Saito, Obu (JP); Suguru Matsushita, Obu (JP); Takahisa Ozaki, Gamagori (JP); Hirokazu Ishida, Nagoya (JP); Shinichi Yamamoto, Toyota (JP); Kazushige Hayashi, Toyota (JP)

(73) Assignees: DENSO CORPORATION, Kariya (JP); Toyota Jidosha Kabushiki Kaisha, Toyota (JP)

( * ) Notice: Subject to any disclaimer, the term of this patent is extended or adjusted under 35 U.S.C. 154(b) by 197 days.

(21) Appl. No.: 13/133,237

(22) PCT Filed: Jul. 5, 2010

(86) PCT No.: PCT/JP2010/004381
§ 371 (c)(1),
(2), (4) Date: Jun. 7, 2011

(87) PCT Pub. No.: WO2011/004576
PCT Pub. Date: Jan. 13, 2011

(65) Prior Publication Data
US 2011/0237191 A1    Sep. 29, 2011

(30) Foreign Application Priority Data
Jul. 7, 2009  (JP) .................. 2009-160741

(51) Int. Cl.
*H04B 7/00* (2006.01)
(52) U.S. Cl.
USPC .................... 455/41.2; 455/39; 455/569.1
(58) Field of Classification Search
None
See application file for complete search history.

(56) References Cited

U.S. PATENT DOCUMENTS

| 7,715,791 B2 | 5/2010 | Matsuda |
| 2001/0002211 A1 | 5/2001 | Lee |
| 2005/0070336 A1* | 3/2005 | Tamura ................... 455/567 |
| 2006/0079182 A1* | 4/2006 | Matsuda ................. 455/41.2 |

(Continued)

FOREIGN PATENT DOCUMENTS

| JP | A-2003-309541 | 10/2003 |
| JP | A-2007-281652 | 10/2007 |

OTHER PUBLICATIONS

International Search Report mailed on Sep. 28, 2010 for the corresponding International patent application No. PCT/JP2010/004381 (and English translation).

(Continued)

*Primary Examiner* — Zhiyu Lu
(74) *Attorney, Agent, or Firm* — Posz Law Group, PLC

(57) ABSTRACT

A short range wireless communication apparatus is disclosed. When multiple communication protocols including a first communication protocol and a second communication protocol are simultaneously connected between the short range wireless communication apparatus and another short range wireless communication apparatus, the short range wireless communication apparatus notifies the another short range wireless communication apparatus a second communication protocol connection request if the first communication protocol is disconnected in response to transmission of a first communication protocol disconnection request to the another short range wireless communication apparatus and then the second communication protocol is disconnected in response to transmission of a second communication protocol disconnection request from the another short range wireless communication apparatus.

4 Claims, 4 Drawing Sheets

(56) References Cited

U.S. PATENT DOCUMENTS

2007/0099674 A1* 5/2007 Saito .................... 455/569.1
2007/0129116 A1 6/2007 Katoh et al.
2008/0051156 A1 2/2008 Matsuda
2008/0192709 A1* 8/2008 Mikami et al. .............. 370/338
2009/0253466 A1* 10/2009 Saito et al. ................ 455/569.2
2010/0184376 A1 7/2010 Matsuda
2011/0169654 A1* 7/2011 Ketari ...................... 340/687

OTHER PUBLICATIONS

Written Opinion mailed on Sep. 28, 2010 for the corresponding International patent application No. PCT/JP2010/004381 (and English translation).

Office Action dated Jun. 13, 2013 issued in the corresponding CN application No. 201080004860.2; English translation.

* cited by examiner

SHORT RANGE WIRELESS COMMUNICATION APPARATUS

CROSS REFERENCE TO RELATED APPLICATION

The present application is based on Japanese Patent Application No. 2009-160741 field on Jul. 7, 2009, disclosure of which is incorporated herein by reference.

TECHNICAL FIELD

The present invention relates to a short range wireless communication apparatus that is configured to be capable of simultaneously connecting multiple communication protocols to another short range wireless communication apparatus when the short range wireless communication apparatus has a short range wireless communication link to the another short range wireless communication apparatus.

BACKGROUND ART

A Bluetooth (registered trademark) (referred to hereinafter as BT) communication apparatuses having a BT communication function is known. A BT communication apparatus may be configured to be capable of simultaneously connecting multiple profiles defined in BT communications standards (what is called a multiple-profile connection) when the BT communication apparatus has a short range wireless communication link to another short range wireless communication apparatus (see Patent Documents 1 to 3 for example).

PRIOR ART DOCUMENT

Patent Document

Patent Document 1: JP-2007-281652A
Patent Document 2: JP-2007-158670A (corresponding to US/20070129116A)
Patent Document 3 JP-2008-53805A (corresponding to US/20080051156A)

SUMMARY OF THE INVENTION

In view of the above background art, the inventors of the present application have found out the following problem.

Suppose that the above-described BT communication apparatuses, each capable of simultaneously connecting multiple profiles, are connected with each other simultaneously using the multiple profiles. In this case, if user operation on a first BT communication apparatus or application control triggers the first BT communication apparatus to notify a second BT communication apparatus of a disconnection request of one profile of the multiple profiles, the second BT communication apparatus notifies the first BT communication apparatus of a disconnection response of the one profile, and the first BT communication apparatus performs an operation to disconnect the one profile. However, depending on specifications of the second BT communication apparatus whose one profile connection is disconnected by the first BT communication apparatus, the second BT communication apparatus may notify the first BT communication apparatus of a disconnection request of another profile of the multiple profiles after the one profile is disconnected by the first BT communication apparatus. Then, when the second BT communication apparatus notifies the first BT communication apparatus of the disconnection request of the another profile of the multiple profiles, the first BT communication apparatus notifies the second BT communication apparatus of a disconnection response of the another profile, and the second BT communication apparatus performs an operation to disconnect the another profile.

In the above case, since the disconnection of the another profile, which disconnection is not intended by the first BT communication apparatus, is made by the second BT communication apparatus, it becomes impossible to provide a function using the another profile. In order to provide the function using the another profile, a user of the first BT communication apparatus needs to conduct a reconnection operation of reconnecting the another profile. This poses a problem of poor usability.

The present invention is made In view of the foregoing. It is an objective of the present invention to provide a short range wireless communication apparatus that can enhance usability and can automatically reconnect a disconnected communication protocol without requiring a user to conduct a reconnection operation of reconnecting the disconnected communication protocol if an unintended disconnection of a communication protocol is made by another short range wireless communication apparatus after multiple communication protocols are simultaneously connected between the subject short range wireless communication apparatus and the another short range wireless communication apparatus.

According to an aspect of the present invention, there is provide a subject short range wireless communication apparatus that includes a short range wireless communication device and the controller, and that is communicatable with another short range wireless communication apparatus. The short range wireless communication device is configured to be capable of simultaneously connecting a plurality of communication protocols to the another short range wireless communication apparatus when the short range wireless communication device has a short range wireless communication link to the another short range wireless communication apparatus. The controller is configured to control the short range wireless communication device to cause connection and disconnection of the plurality of communication protocols including a first communication protocol and a second communication protocol. The controller causes the short range wireless communication device to notify the another short range wireless communication apparatus of a connection request of the second communication protocol if: the plurality of communication protocols is simultaneously connected between the short range wireless communication device and the another short range wireless communication apparatus; the first communication protocol is then disconnected in response to notification of a disconnection request of the first communication protocol from the short range wireless communication device to the another short range wireless communication apparatus; and the second communication protocol is then disconnected in response to notification of a disconnection request of the second communication protocol from the another short range wireless communication apparatus to the short range wireless communication device.

According to the above subject short range wireless communication apparatus, the unintended disconnection of the second communication protocol may be made by the another short range wireless communication apparatus acting as a connection counterpart, if: the first communication protocol is disconnected in response to notification of the disconnection request of the first communication protocol to the another short range wireless communication apparatus; and then the second communication protocol is disconnected in response to notification of the disconnection request of the second communication protocol from the another short range wireless communication apparatus. In this case, the subject short range wireless communication apparatus can notify the another short range wireless communication apparatus of the connection request of the disconnected second communication protocol. Thereby, the subject short range wireless communication apparatus can reconnect the disconnected second communication protocol without requiring a user to conduct a reconnection operation of reconnecting the disconnected second communication protocol. The subject short range wireless communication apparatus can enhance usability.

The above controller may be configured to cause the short range wireless communication device to notify the another short range wireless communication apparatus of a connection request of the short rang wireless communication link, establish the short rang wireless communication link to the another short range wireless communication apparatus and then notify the another short range wireless communication apparatus of the connection request of the second communication protocol if: the plurality of communication protocols is simultaneously connected between the short range wireless communication device and the another short range wireless communication apparatus; the first communication protocol is then disconnected in response to the notification of the disconnection request of the first communication protocol from the short range wireless communication device to the another short range wireless communication apparatus; the second communication protocol is then disconnected in response to the notification of the disconnection request of the second communication protocol from the another short range wireless communication apparatus to the short range wireless communication device; and the short range wireless communication link is further disconnected.

According to the above configuration, if the first communication protocol is disconnected in response to the notification of the disconnection request of the first communication protocol to the another short range wireless communication apparatus acting as the connection counterpart, and if the second communication protocol is then disconnected in response to the notification of the disconnection request of the second communication protocol from the another short range wireless communication apparatus, and if the short range wireless communication link is further disconnected, the subject short range wireless communication apparatus can notify the another short range wireless communication apparatus of a connection request of the disconnected short range wireless communication link. Thereby, the subject short range wireless communication apparatus can automatically reconnect the disconnected short range wireless communication link without requiring a user to conduct a reconnection operation of reconnecting the disconnected short range wireless communication link. In addition, the subject short range wireless communication apparatus can notify the another short range wireless communication apparatus of the connection request of the disconnected second communication protocol, thereby automatically reconnecting the disconnected second communication protocol without requiring a user to conduct a reconnection operation of reconnecting the disconnected second communication protocol.

That is, even if the another short range wireless communication apparatus acting as a connection counterpart is designed to disconnect the short range wireless communication link after all of the simultaneously-connected multiple communication protocols are disconnected, it is possible to provide appropriate measures against this by notifying the another short range wireless communication apparatus of the connection request of the disconnected short range wireless communication link, and by further notifying the another short range wireless communication apparatus of the connection request of the disconnected second communication protocol via the short range wireless communication device.

BRIEF DESCRIPTION OF THE DRAWINGS

The above and other objects, features and advantages of the present invention will become more apparent from the following detailed description made with reference to the accompanying drawings. In the drawings.

EMBODIMENTS FOR CARRYING OUT THE INVENTION

Figure 1:
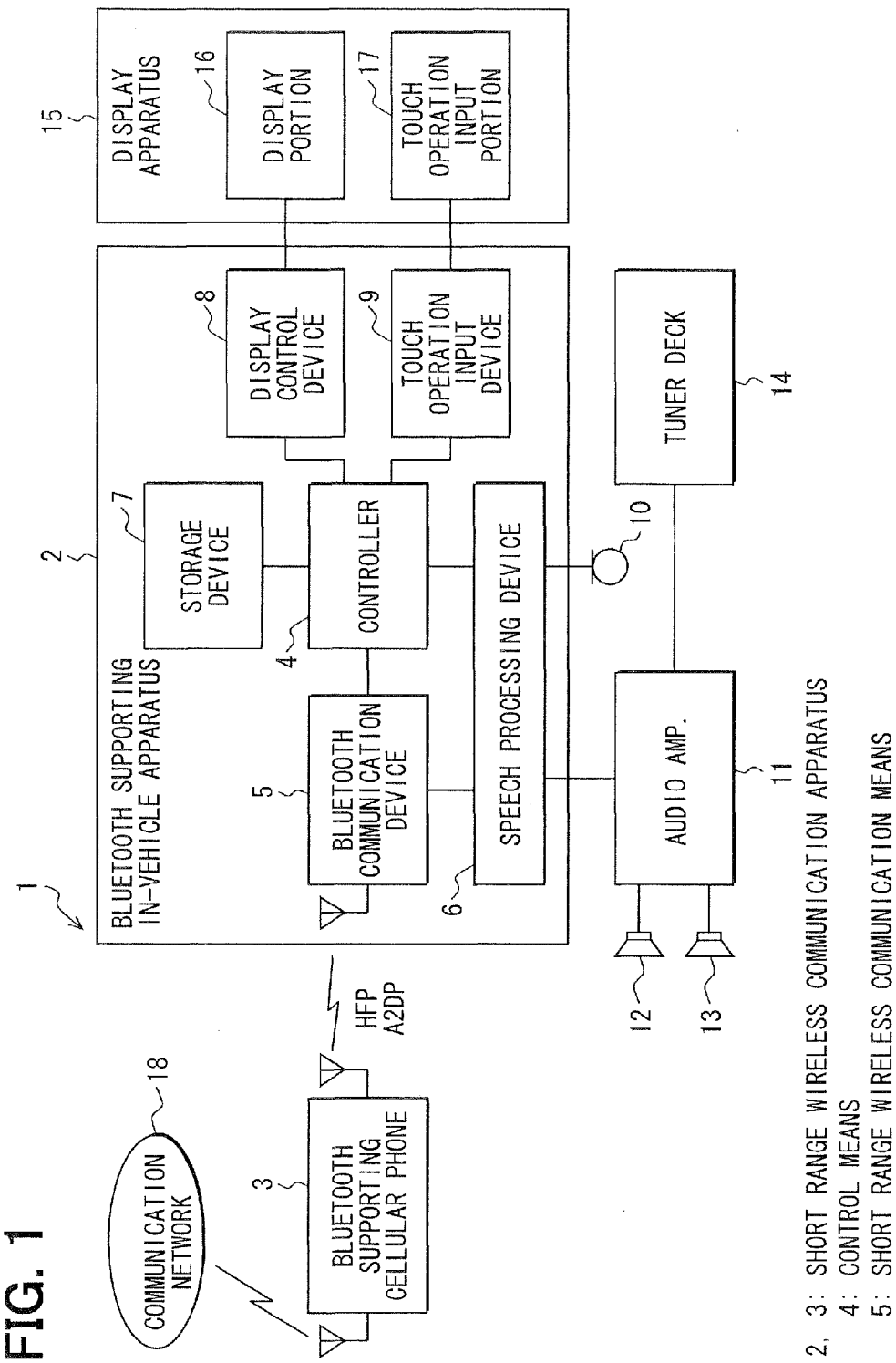
FIG. 1 is a functional block diagram illustrating a short range wireless communication apparatus according to one embodiment of the present invention.

One embodiment of the present invention will be described below with reference to the drawings. An assumed situation is that a Bluetooth (registered trade mark) (referred to hereinafter as BT) support cellular phone having a BT communication function is carried into in a vehicle compartment of a vehicle equipped with an BT support in-vehicle apparatus having a BT communication function, and the in-vehicle apparatus and the cellular phone are communicatable with each other through the BT.

A BT communication system 1 includes an in-vehicle apparatus 2 mounted to a vehicle and a cellular phone 3 carried into a vehicle compartment. The in-vehicle apparatus 2 includes a controller 4 (which can act as control means), a BT communication device 5 (which can act as short range wireless communication means), a speech processing device 6, a storage device 7, a display control device 8, and a touch operation input device 9.

The controller 4 includes a known microcomputer having a CPU, a RAM, ROM and an I/O bus. The controller 4 controls generally all of operation of the in-vehicle apparatus 2 such as communication operation, data management operation and the like. The BT communication device 5 has a function to conduct BT communication with the cellular phone 3. The BT communication device 5 is configured to be capable of simultaneously connecting multiple profiles provided in Bluetooth communications standards (what is called multiple-profile connection), such as HFP (Hands Free Profile) describing handsfree communication, A2DP (Advanced Audio Distribution Profile) describing packet transfer of music steaming data, and the like. These HFP and A2DP mean communication protocols defined on a function basis.

The speech processing device 6 is connected with a microphone 10 and an audio amplifier 11. The microphone 10 is arranged at a place where efficient collection of user uttered voice is possible in the vehicle compartment. For example, the microphone 10 may be located in the vicinity of a steering wheel. The audio amplifier 11 is arranged external with respect to the in-vehicle apparatus 2 and is connected with two speakers 12 and 13.

When the HFP is connected between the BT communication device 5 and the cellular phone 3, the microphone 10 inputs the user uttered voice as outgoing voice data, and the speech processing device 6 conducts speech processing on the inputted outgoing voice data and outputs it to the BT communication device 5. When the BT communication device 5 inputs incoming voice data, the speech processing device 6 outputs the inputted incoming voice data to the audio amplifier 11. The speech processing device 6 has a function to store streaming data and a function to play back the streaming data. When the BT communication device 5 has an A2DP connection to the cellular phone 3 and receives streaming data transmitted from the cellular phone 3, the speech processing device 6 stores the received streaming data, and plays back the stored streaming data and outputs it the audio amplifier 11.

When the incoming voice data or the music streaming data is inputted from the speech processing device 6, the audio amplifier 11 amplifies the inputted incoming voice data or music streaming data, and outputs it from the speaker 12 and the speaker 13. The audio amplifier 11 is further connected with a tuner deck 14. For example, when music is played back from a music storage medium or when a radio program is received from a radio station, the music or the radio program is inputted from the tuner deck 14 to the audio amplifier 11, and the audio amplifier 11 amplifies the inputted music or radio program and outputs it from the speakers 12 and 13.

The storage device 7 can store various data. For example, the various data storable in the storage device 7 include phonebook data, outgoing call history data, incoming call history data and the like. The phonebook data shows a relationship between a phone number and a registered name. The outgoing call history data shows a relationship between a call time and a dialed phone number in an outgoing call made from the in-vehicle apparatus 2 or the cellular phone 3, which is connected with the in-vehicle apparatus 2 using the HFP. The incoming call history data shows a relationship between a reception time and a caller's phone number in an incoming call received with the cellular phone 3, which is connected with the in-vehicle apparatus 2 using the HFP.

A display apparatus 15 includes a display portion 16 for displaying a variety of display screens and a touch operation input portion 17 for providing a touch switch on the display portion 16. When a display instruction signal is inputted from the controller 4, the display control device 8 controls display operation of the display portion 16 of the display apparatus 15 based on the display instruction signal. When an operation detection notification is input from the touch operation input portion 17 to the touch operation input device 9 in response to user operation on the touch switch formed on the display screen, the touch operation input device 9 outputs the inputted operation detection notification to the controller 4, and the controller 4 analyzes the operation detection notification inputted from the touch operation input device 9.

The cellular phone 3 includes: a controller for controlling generally all of operation of the cellular phone 3; a telephone communication device for conducting telephone communication via a communication network 18; a BT communication device for conducting BT communication; a key input device in which various user-operable keys are arranged; a storage device for storing various data such phonebook data showing a relationship between phone numbers and registered names, and the like; a display device for displaying various display screens; a microphone for inputting user uttered voice; and a speaker for outputting, as incoming voice, voice received from a connection counterpart. In the above, the BT communication device of the cellular phone 3 has a function to conduct the BT communication with the in-vehicle apparatus 2. Like the BT communication device 5 of the in-vehicle apparatus 2, the BT communication device of the cellular phone 3 is configured to be capable of simultaneously connecting multiple profiles including the HFP, the A2DP and the like defined in BT communication standards. The communication network 18 includes known equipment for providing a cellular phone communication service, such as a cellular phone base station, a base station control apparatus and the like.

In the above configuration, upon receiving a connection request of a BT communication link from a connection counterpart, each of the in-vehicle apparatus 2 and the cellular phone 3 in a normal operation state approves the received connection request of the BT communication link without rejecting it, and transmits a connection response of the BT communication link to the connection counterpart. Upon receiving connection request of a BT communication link from a connection counterpart, each of the in-vehicle apparatus 2 and the cellular phone 3 in a normal operation state approves the received connection request of the BT communication link without rejecting it, and transmits a connection response of the BT communication link to the communication counterpart. In addition, upon receiving a connection request of a profile from a connection counterpart, each of the in-vehicle apparatus 2 and the cellular phone 3 in a normal operation state approves the received connection request of the profile without rejecting it, and transmits a connection response of the profile to the connection counterpart. Upon receiving a connection request of a profile from a connection counterpart, each of the in-vehicle apparatus 2 and the cellular phone 3 in a normal operation state approves the received connection request of the profile without rejecting it, and transmits a connection response of the profile to the connection counterpart.

Figure 2:
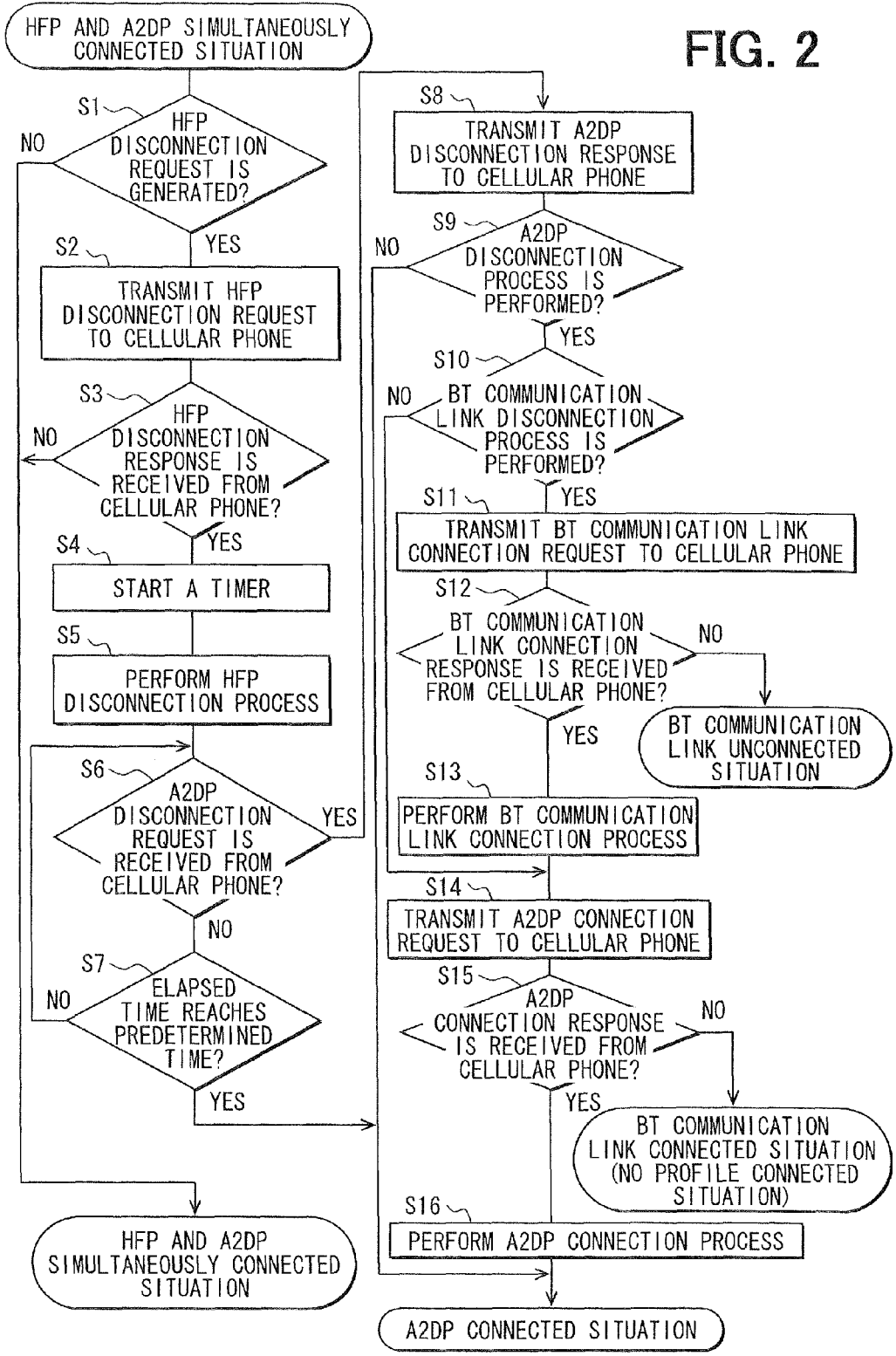
FIG. 2 is a flowchart illustrating an example of operations conducted by an in-vehicle apparatus.
Figure 3:
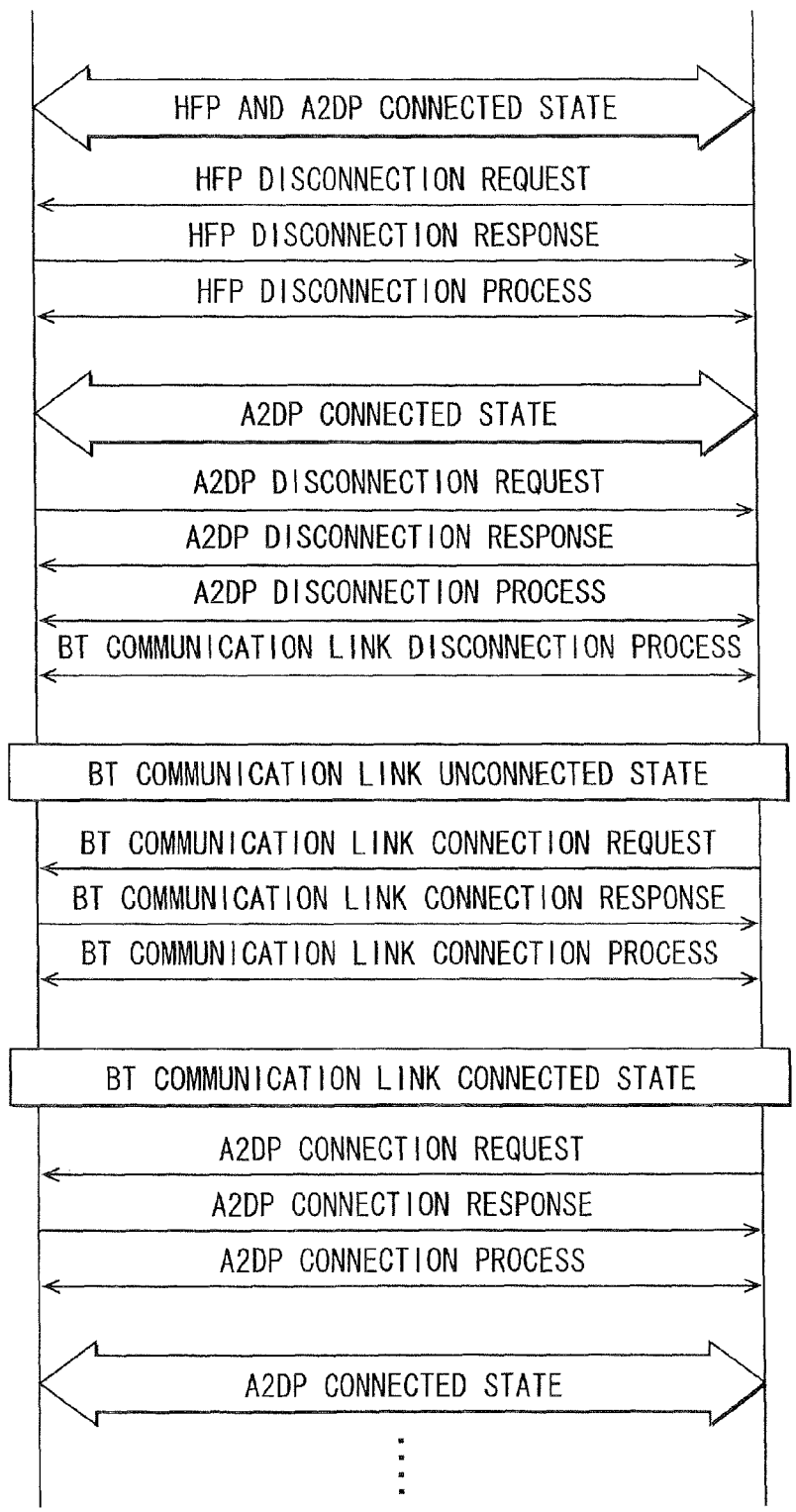
FIG. 3 is a sequence diagram illustrating an example of operations conducted between an in-vehicle apparatus and a cellular phone.
Figure 4:
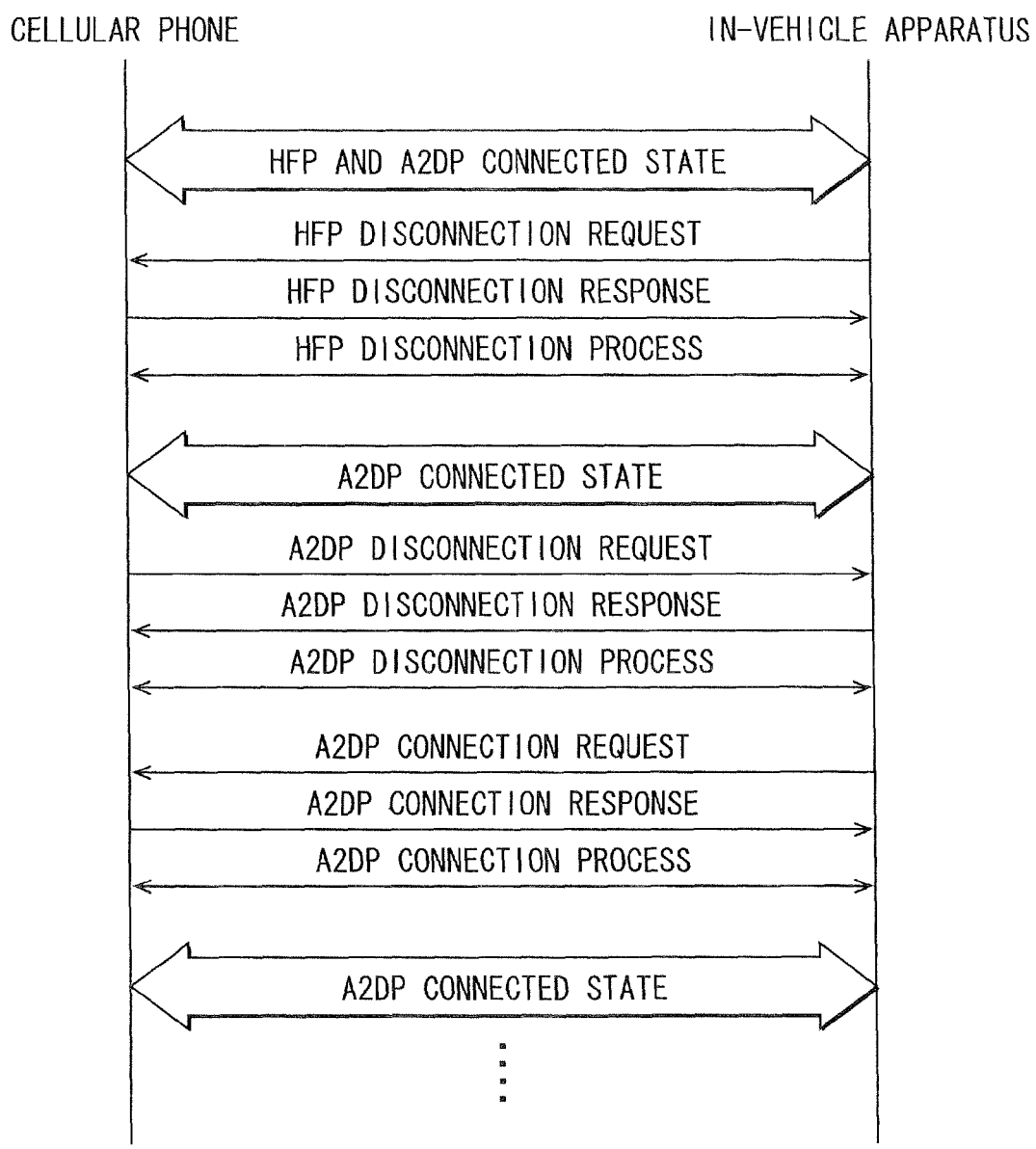
FIG. 4 is a sequence diagram illustrating another example of operations conducted between an in-vehicle apparatus and a cellular phone.

Next, operation associated with the above-described configuration will be described below with reference to FIGS. 2 to 4. An assumed situation is that the in-vehicle apparatus 2 issues a disconnection request of the HFP in a state where the HFP and the A2DP are simultaneously connected between the in-vehicle apparatus 2 and the cellular phone 3. FIG. 2 is a flowchart illustrating processes conducted by the in-vehicle apparatus 2. FIGS. 3 and 4 are sequence diagrams each illustrating processes to be conducted between the in-vehicle apparatus 2 and the cellular phone 3.

When the in-vehicle apparatus 2 is simultaneously connecting the HFP and the A2DP to the cellular phone 3, the controller 4 of the in-vehicle apparatus 2 is conducting a procedure for a HFP-and-A2DP-simantannesly-connected situation. When the controller 4 determines that the disconnection request of the HFP is issued in response to a user operation or application control (corresponding to "YES" at S1), the controller 4 causes the BT communication device 5 to transmit a disconnection request of the HFP to the cellular phone 3 (corresponding to S2), and the controller 4 waits to receive a disconnection response of HFP from the cellular phone 3 (corresponding to S3). When the cellular phone 3 receives the disconnection request of the HFP from the in-vehicle apparatus 2, the cellular phone 3 approves the disconnection request of the HFP without rejecting it and transmits a disconnection response of the HFP to the in-vehicle apparatus 2.

When the controller 4 determines that the controller 4 receives, via the BT communication device 5, the disconnection response of the HFP transmitted from the cellular phone 3 (corresponding to "YES" at S3), the controller 4 starts a timer (corresponding to S4) and performs a HFP disconnection operation to disconnect the HFP connection to the cellular phone 3 (corresponding to S5). In this case, since the controller 4 has performed the operation to disconnect the HFP connection to the cellular phone 3, a connection state becomes an A2DP connected state, in which only the A2DP is connected between the BT communication device 5 and the cellular phone 3. The controller 4 determines whether the BT communication device 5 receives a disconnection request of the A2DP from the cellular phone 3 (corresponding to S6), and the controller 4 determines whether an elapsed time, which is a time that has elapsed since the controller 4 received the disconnection response of the HFP from the cellular phone 3 via the BT communication device 5, reaches a predetermined time (corresponding to S7).

Depending on specifications of a cellular phone 3 connected with the in-vehicle apparatus 2 via a BT communication link, the following occurs after the HFP and the A2DP are simultaneously connected between the cellular phone 3 and the in-vehicle apparatus 2. If the HFP is disconnected in response to transmission of a disconnection request of the HFP from the in-vehicle apparatus 2, the disconnection of the HFP may trigger the cellular phone 3 to issue a disconnection request of the A2DP connected between the cellular phone 3 and the in-vehicle apparatus 2. When the disconnection request of A2DP is issued, the cellular phone 3 transmits a disconnection request of the A2DP to the in-vehicle apparatus 2.

When the controller 4 determines that the controller 4 receives, via the BT communication device 5, the transmitted disconnection request of the A2DP from the cellular phone 3 before the elapsed time, which is a time that has elapsed since the controller 4 received the disconnection response of the HFP from the cellular phone 3 via the BT communication device 5, reaches the predetermined time (corresponding to "YES" at S6), the controller 4 approves the received disconnection request of the A2DP without rejecting it and transmits a disconnection response of the A2DP to the cellular phone 3 via the BT communication device 5 (corresponding to S8). The controller 4 determines whether a disconnection operation to disconnect the A2DP connection to the cellular phone 3 is performed (corresponding to S9). When the cellular phone 3 receives the disconnection response of the A2DP transmitted from the in-vehicle apparatus 2, the cellular phone 3 performs the disconnection operation to disconnect the A2DP connection to in-vehicle apparatus 2, and further, the cellular phone 3 performs a BT communication link disconnection operation to disconnect the BT communication link to the in-vehicle apparatus 2.

When the controller 4 determines that the A2DP disconnection operation is performed (corresponding to "YES" at S9), the controller 4 determines whether the operation to disconnect the BT communication link to the cellular phone 3 is performed (corresponding to S10). When the controller 4 determines that the operation to disconnect the BT communication link to the cellular phone 3 is performed (corresponding to "YES" at S10), the controller 4 causes the BT communication device 5 to transmit a connection request of the BT communication link to the cellular phone 3 (corresponding to S11). The controller 4 waits to receive a connection response of the BT communication link from the cellular phone 3 (corresponding to S12). When the cellular phone 3 receives the connection request of the BT communication link transmitted from the in-vehicle apparatus 2, the cellular phone 3 approves the connection request of the BT communication link without rejecting it and transmits the connection response of the BT communication link to the in-vehicle apparatus 2.

When the controller 4 determines that the controller 4 receives, via the BT communication device 5, the connection request of the BT communication link transmitted from the cellular phone 3 (corresponding to "YES" at S12), the controller 4 performs a BT communication link connection operation to connect the BT communication link to the cellular phone 3 (corresponding to S13). Then, the controller 4 transmits a connection request of the A2DP to the cellular phone 3 via the BT communication device 5 (corresponding to S14), and the controller 4 waits to receive a connection response of the A2DP from the cellular phone 3 (corresponding to S15). When the cellular phone 3 receives the connection request of the A2DP transmitted from the in-vehicle apparatus 2, the cellular phone 3 approves the received connection request of the A2DP without rejecting and transmits the connection response of the A2DP to the in-vehicle apparatus 2.

Then, when the controller 4 determines that the controller 4 receives, via the BT communication device 5, the connection response of the A2DP transmitted from the cellular phone 3 (corresponding to "YES" at S15), the controller 4 performs a A2DP connection operation to connect the A2DP to the cellular phone 3 (corresponding to S16), and the operation proceeds to a procedure for a A2DP connected situation. In this case also, since the in-vehicle apparatus 2 has performed the operation to connect the A2DP to the cellular phone 3, the connection state is the A2DP connected state, in which the A2DP only is connected between the BT communication device 5 and the cellular phone 3.

That is, if the disconnection request of the HFP is generated after the HFP and the A2DP are simultaneously connected between the in-vehicle apparatus 2 and the cellular phone 3, the HFP connection to the cellular phone 3 is disconnected. Then, depending on specifications of the cellular phone 3 acting as the connection counterpart, the A2DP connection to the cellular phone 3 may be disconnected by the cellular phone 3 and the BT communication link to the cellular phone 3 may be disconnected. However, the in-vehicle apparatus 2 then transmits the connection request of the BT communication link to the cellular phone 3 and thereby can reconnect the BT communication link, and moreover, the in-vehicle apparatus 2 transmits the connection request of A2DP and thereby can reconnect the A2DP.

Depending on specifications of a cellular phone 3 acting as the connection counterpart, after the cellular phone 3 performs the A2DP disconnection operation to disconnect the ADP connection to the in-vehicle apparatus 2, the cellular phone 3 may maintains the BT communication link to the in-vehicle apparatus 2 without performing the BT communication link disconnection operation. In this case, as shown in FIG. 4, the controller 4 determines that the A2DP disconnection operation is performed (corresponding to "YES" at S9), and then the controller 4 determines that the operation to disconnect the BT communication link to the cellular phone 3 is not performed (corresponding to "NO" at S10), and the controller 4 transmits the connection request of the A2DP to the cellular phone 3 via the BT communication device 5 while maintaining the BT communication link to the cellular phone 3 (corresponding to S14), and the controller 4 waits to receive the connection response of the A2DP from the cellular phone 3 (corresponding to S15). When the controller 4 determines that the controller 4 receives, via the BT communication device 5, the transmitted connection response of the A2DP from the cellular phone 3 (corresponding to "YES" at S15), and the controller 4 performs the A2DP connection operation to connect the A2DP to the cellular phone 3 (corresponding to S16), and the operation proceeds to the procedure for a A2DP connected situation.

If the controller 4 performs the HFP disconnection operation to disconnect the HFP connection to the cellular phone 3 (corresponding to S5), and if the controller 4 determines that the elapsed time, which is a time that has elapsed since the controller 4 received the disconnection response of the HFP from the cellular phone 3 via the BT communication device 5, reaches the predetermined time before the controller 4 receives the disconnection response of the A2DP from the cellular phone 3 via the BT communication device 5 (corresponding to "YES" at S7), the connection state is kept at the A2DP connected state in which only A2DP is connected, and the operation proceeds to the procedure for a A2DP connected situation. Alternatively, if the controller 4 transmits the disconnection response of the A2DP to the cellular phone 3 via the BT communication device 5 (corresponding to S8), and if the controller 4 then determines that the A2DP disconnection operation to disconnect the A2DP connection to the cellular phone 3 is not performed (corresponding to "NO" at S9), the connection state in this case is also kept at the A2DP connected state in which only A2DP is connected. Thus, the operation proceeds to the procedure for an A2DP connected situation.

In addition, if the controller 4 causes the BT communication device 5 to transmit the connection request of the BT communication link to the cellular phone 3 (corresponding to S11), and if the controller 4 then determines that the controller 4 does not receive the connection response of the BT communication link from the cellular phone 3 via the BT communication device 5 (corresponding to "NO" at S12), the connection state is maintained at a BT communication link disconnected state. Thus, the operation proceeds to a procedure for a BT communication link disconnected situation. In addition, if the controller 4 causes the BT communication device 5 to transmit the connection request of the A2DP to the cellular phone 3 (corresponding to S14), and if the controller 4 then determines that the controller 4 does not receives the connection response of the BT communication link from the cellular phone 3 via the BT communication device 5 (corresponding to "NO" at S15), the connection state is a BT communication link connected state while no profile is connected. Thus, the operation proceeds to the procedure for a BT communication link connected situation (no profile connected situation).

The foregoing is directed to a case in which the disconnection request of the HFP is generated in the in-vehicle apparatus 2 when the HFP and the A2DP are simultaneously connected between the in-vehicle apparatus 2 and the cellular phone 3. However, the same can apply to a case in which the disconnection request of the A2DP is generated in the in-vehicle apparatus 2. For example, although the in-vehicle apparatus 2 may disconnect the A2DP connection to the cellular phone 3 and then the cellular phone 3 may disconnect the HFP connection to the cellular phone 3, the in-vehicle apparatus 2 can then transmit the connection request of the HFP to the cellular phone 3, thereby reconnecting the HFP. The same can apply to a case where the connection request of the HFP or the A2DP is generated in the cellular phone 3.

According to the present embodiment as described above, if the disconnection request of the HFP is generated in the in-vehicle apparatus 2 after the in-vehicle apparatus 2 and the cellular phone 3 are connected with each other simultaneously using the HFP and the A2DP, and if the HFP is disconnected in response to transmission of the disconnection request of the HFP to the cellular phone 3, and if the A2DP is then disconnected in response to transmission of the disconnection request of the A2DP from the cellular phone 3, the unintended disconnection of the A2DP is made by the cellular phone 3. However, the in-vehicle apparatus 2 can transmit the connection request of the A2DP to the cellular phone 3, and thereby can automatically reconnect the disconnected A2DP without requiring a user to conduct a reconnection operation of reconnecting the disconnected A2DP. It is therefore enhance usability.

Moreover, if the A2DP is disconnected in response to transmission of the disconnection request of the A2DP from the cellular phone 3, and even if the BT communication link is further disconnected, it is possible to transmit the connection request of the BT communication link to the cellular phone 3 and it is possible to automatically reconnect the disconnected BT communication link without requiring a user to conduct a reconnection operation to reconnect the disconnected BT communication link. That is, even if a cellular phone 3 acting as a connection counterpart is designed to disconnect the BT communication link after the simultaneously connected HFP and A2DP are disconnected, it is possible to take appropriate measures by transmitting the connection request of the disconnected BT communication link to the cellular phone 3.

The above embodiments can be modified or extended in various ways, examples of which are described below.

A short range wireless communication apparatus is not limited to an in-vehicle apparatus 2 mounted to a vehicle and a cellular phone 3 portable by a user. The short range wireless communication apparatus may be another apparatus having a short range wireless communication function, such as a personal digital assistant and the like. When an in-vehicle apparatus is used as the short range wireless communication apparatus, the in-vehicle apparatus may be an apparatus further having another function, such as a navigation apparatus having a navigation function, and the like.

Profiles simultaneously connectable between the in-vehicle apparatus 2 and the cellular phone 3 may include other profiles such as DUN (Dial-UP Network Profile) describing a dial-up network service, MAP (Message Access Profile) describing mail information transfer, PBAP (Phone Book Access Profile) describing phone book data transfer, OPP (Object Push Profile) describing various data transfer, and the like.

It is possible to apply to a case where three or more kinds of profiles are simultaneously connected between the in-vehicle apparatus 2 and the cellular phone 3. For example, suppose that: the in-vehicle apparatus 2 simultaneously connects three kinds of profiles A to C to the cellular phone 3; the disconnection request of the profile A is generated in the in-vehicle apparatus 2; and the profile A is disconnected in response to transmission of the disconnection request of the profile A to the cellular phone 3. In this case, if the profile B and the profile C are disconnected in response to transmission of the disconnection request of the profile B and the disconnection request of the profile C from the cellular phone 3, the in-vehicle apparatus 2 may transmit the connection request of the profile B and the connection request of the profile C to the cellular phone 3, thereby automatically reconnecting the disconnected profile B and profile C.

In the above embodiments, the in-vehicle apparatus 2 is an example of a subject short range wireless communication apparatus. The cellular phone 3 is an example of another short range wireless communication apparatus. The controller 4 is an example of a control means, and the BT communication device 5 is an example of a short range wireless communication means or short range wireless communication device.

The invention claimed is:

1. A subject short range wireless communication apparatus communicable with another short range wireless communication apparatus, the subject short range wireless communication apparatus comprising:
   a short range wireless communication device capable of simultaneously connecting a plurality of communication protocols to the another short range wireless communication apparatus when the short range wireless communication device has a short range wireless communication link to the another short range wireless communication apparatus; and
   a controller capable of controlling the short range wireless communication device to cause connection and disconnection of the plurality of communication protocols including a first communication protocol and a second communication protocol,
   the controller being configured to cause the short range wireless communication device to notify the another short range wireless communication apparatus of a connection request of the second communication protocol if:
      the plurality of communication protocols is simultaneously connected between the short range wireless communication device and the another short range wireless communication apparatus;
      the first communication protocol is then disconnected in response to notification of a disconnection request of the first communication protocol from the short range wireless communication device to the another short range wireless communication apparatus; and
      the second communication protocol is then disconnected in response to notification of a disconnection request of the second communication protocol from the another short range wireless communication apparatus to the short range wireless communication device before elapse of a predetermined time period from the disconnection of the first communication protocol.

2. A subject short range wireless communication apparatus communicable with another short range wireless communication apparatus, the subject short range wireless communication apparatus comprising:
   a short range wireless communication device capable of simultaneously connecting a plurality of communication protocols to the another short range wireless communication apparatus when the short range wireless communication device has a short range wireless communication link to the another short range wireless communication apparatus; and
   a controller capable of controlling the short range wireless communication device to cause connection and disconnection of the plurality of communication protocols including a first communication protocol and a second communication protocol, wherein
   the controller is configured to cause the short range wireless communication device to (i) notify the another short range wireless communication apparatus of a connection request of the short rang wireless communication link, (ii) establish the short rang wireless communication link to the another short range wireless communication apparatus and then (iii) notify the another short range wireless communication apparatus of the connection request of the second communication protocol if:
      the plurality of communication protocols is simultaneously connected between the short range wireless communication device and the another short range wireless communication apparatus;
      the first communication protocol is then disconnected in response to notification of a disconnection request of the first communication protocol from the short range wireless communication device to the another short range wireless communication apparatus;
      the second communication protocol is then disconnected in response to notification of a disconnection request of the second communication protocol from the another short range wireless communication apparatus to the short range wireless communication device before elapse of a predetermined time period from the disconnection of the first communication protocol; and
      the short range wireless communication link is further disconnected.

3. The subject short range wireless communication apparatus according to claim 1, wherein:
   the controller causes the short range wireless communication device to (i) notify the another short range wireless communication apparatus of a connection request of the second communication protocol (ii) without notifying the another short range wireless communication apparatus of a connection request of the first communication protocol, if:
      the plurality of communication protocols is simultaneously connected between the short range wireless communication device and the another short range wireless communication apparatus;
      the first communication protocol is then disconnected in response to notification of a disconnection request of the first communication protocol from the short range wireless communication device to the another short range wireless communication apparatus; and
      the second communication protocol is then disconnected in response to notification of a disconnection request of the second communication protocol from the another short range wireless communication apparatus to the short range wireless communication device before elapse of a predetermined time period from the disconnection of the first communication protocol.

4. The subject short range wireless communication apparatus according to claim 2, wherein:
   the controller causes the short range wireless communication device to (i) notify the another short range wireless communication apparatus of a connection request of the short range wireless communication link, (ii) establish the short range wireless communication link to the another short range wireless communication apparatus and then (iii) notify the another short range wireless communication apparatus of the connection request of the second communication protocol without notifying the another short range wireless communication apparatus of a connection request of the first communication protocol, if:
      the plurality of communication protocols is simultaneously connected between the short range wireless communication device and the another short range wireless communication apparatus;
      the first communication protocol is then disconnected in response to notification of a disconnection request of the first communication protocol from the short range wireless communication device to the another short range wireless communication apparatus;
      the second communication protocol is then disconnected in response to notification of a disconnection request of the second communication protocol from the another short range wireless communication apparatus to the short range wireless communication device before elapse of a predetermined time period from the disconnection of the first communication protocol; and the short range wireless communication link is further disconnected.

* * * * *